(No Model.)
C. PABST.
GALVANIC BATTERY.
No. 295,671. Patented Mar. 25, 1884.
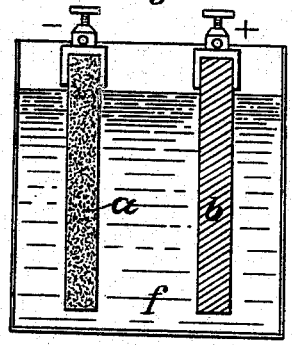
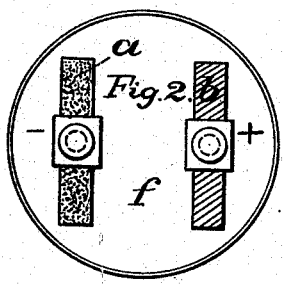
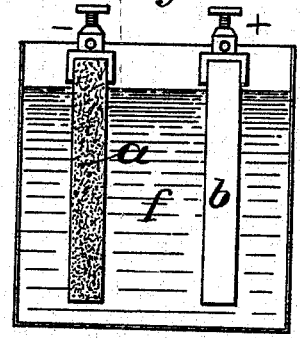
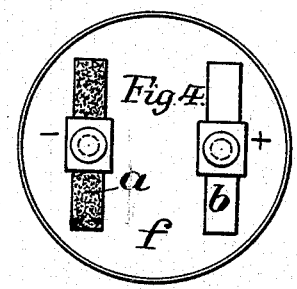

UNITED STATES PATENT OFFICE.

CONRAD PABST, OF STETTIN, GERMANY.

GALVANIC BATTERY.

SPECIFICATION forming part of Letters Patent No. 295,671, dated March 25, 1884.

Application filed July 5, 1883. (No model.)

*To all whom it may concern:*

Be it known that I, CONRAD PABST, a subject of the Emperor of Germany, and resident at Stettin, Germany, have invented new and useful Improvements in Galvanic Batteries, of which the following is a specification.

Heretofore in constructing electric batteries or piles with a carbon and a metal electrode both in one and the same exciting-liquid, the polarization of the carbon was cause of much trouble and loss of power, and it was sought to remedy it by using muriatic or chromic acid or superoxide of manganese, which, however, would never be satisfactory in giving a constant and continuous current.

It is the object of my invention to construct a pile that will give a constant and continuous current of electricity, the pile giving no trouble whatever, except after a long period of time, when the metal electrode will have to be replaced by reason of being decomposed.

My invention relates to the single-cell piles, with carbon as the one electrode and a metal as the other, and utilizing the oxygen of the atmosphere; and it consists in using as exciting-fluid, wherein the electrodes are placed directly, the aqueous solution of the compounds of chlorine with such metals, whereof there are existing two combinations with chlorine, both soluble in water, said two combinations corresponding to the protoxide and the oxide of the metal.

Experiments have shown that the aqueous solution of chloride of iron and of perchloride of tin are exciting-fluids corresponding to the metal electrodes tin and iron, and I combine, therefore, my pile as follows: carbon and iron in a solution of perchloride of iron. The metal tin is equivalent to the iron as electrode; and as exciting-fluid, in combination with either of the two metals iron and tin, either perchloride of iron or perchloride of tin may be used. All the possible and equivalent combinations, therefore, are as follows: first, carbon-iron in a solution of perchloride of iron; second, carbon-iron in a solution of subchloride of iron; third, carbon-iron in a solution of perchloride of tin; fourth, carbon-iron in a solution of subchloride of tin; fifth, carbon-tin in a solution of perchloride of tin; sixth, carbon-tin in a solution of subchloride of tin; seventh, carbon-tin in a solution of perchloride of iron; eighth, carbon-tin in a solution of subchloride of iron. I prefer as the cheapest and simplest combination carbon-iron and perchloride of iron. Said combination, like all those given in the above, are of the property to be continuously acting until the iron is consumed, and to be of constant power. The chemical or electrolytic action will be: By the influence of the iron electrode the compound of chlorine, which is perchloride of iron, will be reduced from its higher state of oxidation to the lowest state, or to subchloride; but immediately this latter will be brought back again to the higher state of oxidation by absorption of the oxygen of the atmosphere, which will combine with the iron, and will force the chlorine which first separated from the perchloride, and which attracts the iron back again, thus forming with part of the electrode oxide of iron, and at the same time bringing the exciting-fluid back again to perchloride of iron, whereupon the whole chemical action will again take place, and thus the process and the acting of the pile will be continuous. The oxide of iron will settle and deposit in form of a fine powder at the bottom of the vessel, and will not deposit on the electrode. Therefore the fatal polarization which is found in most of the other piles, and which is generated by the adherence of decomposed or oxidized matter on the electrodes, is completely avoided in my novel pile.

Owing to the particular manner of chemical action in my pile, it will not interfere with the result to take, instead of a solution of the subchloride, as the latter will at once be brought up to the higher state of oxidation, the perchloride of iron.

As is seen, the liquid which I use in my pile will regenerate indefinitely, and can be used over and over again simply by filtering it from time to time, in order to remove the deposit at the bottom of the cell. Thus the energy of the pile is made constant until the metal electrode is consumed. It may be stated here that in general the result described in the above is obtained by selecting for the metallic electrode such metals which are able to form the combinations of peroxide and suboxide, and also the soluble combinations of perchloride and subchloride, and, further, by selecting as exciting-liquid diluted combinations of chlorine and such a metal as has been described as suitable for the electrode.

In the accompanying drawings, Figure 1 represents a vertical cross-section through one of my piles with the electrodes carbon and tin; Fig. 2, a plan of the same; Fig. 3, a vertical cross-section of a pile with the electrodes carbon and iron; and Fig. 4 represents a plan of the same.

In Figs. 1 and 2, $a$ represents the carbon electrode, $b$ the tin electrode, and $b'$ the iron electrode, immersed in the exciting-liquid $f$, which may be either a solution of perchloride of iron or tin or a solution of subchloride of iron or tin.

In Figs. 3 and 4, $a$ represents the carbon electrode, and $b$ the iron electrode, both immersed in the exciting-liquid $f$, which in this case may be either of those described for Figs. 1 and 2.

I am well aware that tin has already been used as material for one of the electrodes, but always in combination with what is termed "double cells," where an inner cup and an outer cup filled with different exciting-liquids are used. So, for instance, tin immersed in dilute sulphuric acid, in combination with carbon immersed in nitric acid, has been used, and in another case, and again in a double cell, tin has been used immersed in an acid, in combination with another electrode immersed in another acid. All these double-cell piles are entirely different from my "single-cell" pile, and are nothing else but modified Bunsen piles in which the zinc is replaced by tin. The chemical action, therefore, and the result must be entirely different from mine. The piles will act more vigorously in the beginning, and will by and by, owing to the fatal effect of the polarization, become inactive. They can never furnish a constant current, and are neither continuously acting, because no regenerative process in the liquid will take place.

I am well aware also that perchloride of iron has been used as electrolytic liquid in double-cell piles, the electrode immersed in this perchloride solution being carbon, in combination with zinc immersed in sea-salt solution. These piles, as proposed by Duchemin, are of no constant power, first, because the depolarization is not complete; and, second, because deposits are made on the zinc, said deposits being of little conductive power and weakening the generated current. These batteries, therefore, are also incapable of continuous action, because they are merely modified Bunsen piles—double-cell piles—from which latter they differ by having the dilute sulphuric acid replaced by sea-salt solution, and the nitric acid by perchloride of iron. The chemical process of course is entirely different from that in my pile, where metal and carbon electrodes are directly immersed in the same liquid, which is a regenerative one.

I am further aware that iron has been used in a double-cell pile immersed in hydrochloric acid, in combination with carbon immersed in nitric acids. This pile requires a frequent replacing of the liquid, and is again of the Bunsen type, and the same may be mentioned here as for the modified Bunsen piles given in the above.

Finally, I am aware that in a "triple-cell" pile hematite-iron has been used immersed in hydrochloric acids or in chloride of ammonia, in combination with carbon immersed in an acid, and with iron and acidulated water, which pile has also been proposed in modified forms, but always either as triple or as double cell piles. It is also evident that here the chemical action must be an entirely different one from the one in my pile, and that the same objections apply here as for the piles of the Bunsen type.

Having thus fully described my invention, what I claim as new, and desire to secure by Letters Patent, is—

1. In a single cell or pile, two electrodes—carbon and metal—immersed in the aqueous solution of the compound consisting of chlorine, with such metals whereof there are existing two combinations with chlorine, both soluble in water, the compound corresponding to the protoxide and the oxide of the metal.

2. In a single cell or pile, two electrodes—carbon and iron—immersed in a solution of perchloride of iron, substantially as shown and described.

In testimony whereof I have signed my name to this specification in the presence of two subscribing witnesses.

CONRAD PABST.

Witnesses:
  A. SCHUBERT,
  CARL KRAMPE.